United States Patent
Berkley

(10) Patent No.: US 7,639,035 B2
(45) Date of Patent: Dec. 29, 2009

(54) QUBIT STATE COPYING

(75) Inventor: Andrew J. Berkley, Vancouver (CA)

(73) Assignee: D-Wave Systems, Inc., Burnaby, British Columbia (CA)

( * ) Notice: Subject to any disclaimer, the term of this patent is extended or adjusted under 35 U.S.C. 154(b) by 779 days.

(21) Appl. No.: 11/411,051

(22) Filed: Apr. 25, 2006

(65) Prior Publication Data

US 2006/0248618 A1    Nov. 2, 2006

Related U.S. Application Data

(60) Provisional application No. 60/675,139, filed on Apr. 26, 2005.

(51) Int. Cl.
*H03K 19/195* (2006.01)

(52) U.S. Cl. ............................. 326/2; 326/3; 326/6

(58) Field of Classification Search ............... None
See application file for complete search history.

(56) References Cited

U.S. PATENT DOCUMENTS

| | | | |
|---|---|---|---|
| 6,838,694 B2 | 1/2005 | Esteve et al. | |
| 2004/0016918 A1 * | 1/2004 | Amin et al. | 257/14 |
| 2005/0082519 A1 | 4/2005 | Amin et al. | |
| 2005/0256007 A1 * | 11/2005 | Amin et al. | 505/170 |

OTHER PUBLICATIONS

Inokuchi, T. et al., "Analog Computation using Quantum-Flux Parametron Devices," Physica C, 357-360, pp. 1618-1621, Department of Electrical Engineering, Hokkaido University, Kita 13, Nishi 8, Sapporo 060-8628, Japan, Jan. 12, 2001.

Blatter et al., Design Aspects of Superconducting-Phase Quantum Bits, Physical Review B, Dec. 14, 1999, vol. 63, No. 17, 174511.

Bocko et al., Prospects for Quantum Coherent Computation Using Superconducting Electronics, IEEE Transactions on Applied Superconductivity, Jun. 1997, pp. 3638-3641, vol. 7, No. 2.

Deutsch, Quantum Theory, the Church-Turing Principle and the Universal Quantum Computer, Proceedings of the Royal Society of London A 400, 1985, pp. 97-117.

Farhi et al., A Quantum Adiabatic Evolution Algorithm Applied to Random Instances of an NP-Complete Problem, Science, Apr. 20, 2001, pp. 472-476, vol. 292.

Feynman, Simulating Physics with Computers, International Journal of Theoretical Physics, 1982, pp. 467-488, vol. 21, Nos. 6/7.

Friedman et al., Quantum Superposition of Distinct Macroscopic States, Nature, Jul. 6, 2000, pp. 43-46, vol. 406.

Il'ichev et al., Continuous Monitoring of Rabi Oscillations in a Josephson Flux Qubit, Physical Review Letters, Aug. 29, 2003, vol. 91, No. 9, 097906.

Ioffe et al., Environmentally Decoupled sds-wave Josephson Junctions for Quantum Computing, Nature, Apr. 22, 1999, pp. 679-681, vol. 398.

(Continued)

*Primary Examiner*—Anh Q Tran
(74) *Attorney, Agent, or Firm*—Seed IP Law Group PLLC

(57) ABSTRACT

Systems and methods for copying the classical state of a source qubit to a target qubit are provided. These techniques may be used to read out the states of an array of qubits.

83 Claims, 9 Drawing Sheets

OTHER PUBLICATIONS

Majer et al., Spectroscopy on Two Coupled Flux Qubits, arXiv:cond-mat/0308192 v1, Aug. 10, 2003.

Makhlin et al., Quantum-State Engineering With Josephson-Junction Devices, Reviews of Modern Physics, Apr. 2001, pp. 357-400, vol. 73, No. 2.

Mooij et al., Josephson Persistent-Current Qubit, Science, Aug. 13, 1999, pp. 1036-1039, vol. 285.

Nielsen et al., Quantum Computation and Quantum Information, 2000, pp. 344-345, Cambridge University Press, Cambridge, MA.

Orlando et al., Superconducting Persistent-Current Qubit, Physical Review B, Dec. 1, 1999, vol. 60, No. 22, 15398.

Paternostro et al., Quantum-State Transfer in Imperfect Artificial Spin Networks, Physical Review A, 2005, vol. 71, No. 4, 042311.

Shnirman et al., Quantum Manipulations of Small Josephson Junctions, Physical Review Letters, Sep. 22, 1997, pp. 2371-2374, vol. 79, No. 12.

Shor, Introduction to Quantum Algorithms, arXiv:quant-ph/0005003 v2, Jul. 6, 2001.

* cited by examiner

QUBIT STATE COPYING

CROSS REFERENCE TO RELATED APPLICATIONS

This application claims benefit, under 35 U.S.C. § 119(e), of U.S. Provisional Patent Application No. 60/675,139, filed on Apr. 26, 2005, which is hereby incorporated by reference herein in its entirety.

1. FIELD OF THE INVENTION

The present methods and systems are related to the field of quantum computing and, in particular, to superconducting devices.

2. BACKGROUND

In 1982, Richard Feynman proposed that a controllable quantum system could be used to simulate other quantum systems more efficiently than conventional computers. See Feynman, 1982, *International Journal of Theoretical Physics* 21, pp. 467-488. This controllable quantum system is now commonly referred to as a quantum computer, and effort has been put into developing a general purpose quantum computer that can be used to simulate quantum systems or run specialized quantum algorithms. In particular, solving a model for the behavior of a quantum system commonly involves solving a differential equation related to the Hamiltonian of the quantum system. David Deutsch observed that a quantum system could be used to yield a time savings, later shown to be an exponential time savings, in certain computations. If one had a problem, modeled in the form of an equation that represented the Hamiltonian of the quantum system, the behavior of the system could provide information regarding the solutions to the equation. See Deutsch, 1985, *Proceedings of the Royal Society of London* A 400, pp. 97-117.

One limitation in the quantum computing art is the identification of systems that can support quantum computation. As detailed in the following sections, a qubit, which is analogous to a "bit" of a classical digital computer, serves as the basis for storing quantum information. However, qubits must be able to retain coherent quantum behavior long enough to perform quantum computations. The loss of coherent quantum behavior is referred to as decoherence. Further, techniques for reading the state of qubits are needed in order to determine the result of a quantum computation. Ideally, such readout mechanisms do not introduce decoherence to the quantum computing system prior to a readout operation.

The computing power of a quantum computer increases as its basic building blocks, qubits, are coupled together in such a way that the quantum state of one qubit affects the quantum state of each of the qubits to which it is coupled. This form of coupling includes the effect referred to as entanglement. Another limitation in the quantum computing art is the identification of methods that can be used to controllably entangle the states of qubits without introducing a significant source of decoherence.

2.1 Approaches to Quantum Computing

There are several general approaches to the design and operation of a quantum computer. One approach referred to as "circuit model quantum computing" is based on a model in which logical gates are applied to qubits, much like bits, and can be programmed to perform calculations using quantum logic. This model of quantum computing requires qubits with long coherence times. Efforts have made to develop robust qubits that can perform quantum logic functions. For example, see Shor, 2001, arXiv.org:quant-ph/0005003. However, reducing qubit decoherence in quantum systems to the point that many calculations are performed before quantum information stored in the quantum system is destroyed has not been satisfactorily achieved in the art.

Another approach to quantum computing known as "thermally-assisted adiabatic quantum computing," involves finding the lowest energy configuration of an array of qubits. This approach does not make critical use of quantum gates and circuits. Instead, it uses classical effects, and quantum effects in some cases, to manipulate the states of a system of interacting qubits starting from a known initial Hamiltonian so that the final state represents the Hamiltonian of the physical system in question. In this process, quantum coherence is not a strict requirement for the qubits. An example of this type of approach is adiabatic quantum computing. See, for example, Farhi et al., 2001, *Science* 292, pp. 472-476.

2.2 Qubits

A quantum bit, or qubit, is the quantum mechanical analog of the conventional digital bit. Instead of only encoding one of two discrete states, like "0" and "1" in a bit, a qubit can also be placed in a superposition of 0 and 1. That is, the qubit can exist in both the "0" and "1" state at the same time, and can thus perform a quantum computation on both states simultaneously. Thus, a qubit holding a pure discrete state (0 or 1) is said to be in a classical state, whereas a qubit holding a superposition of states is said to be in a quantum state. In general, N qubits can be in a superposition of $2^N$ states. Quantum algorithms make use of the superposition property to speed up certain computations.

In standard notation, the basis states of a qubit are referred to as the $|0\rangle$ and $|1\rangle$ states. During quantum computation, the state of a qubit, in general, is a superposition of basis states so that the qubit has a nonzero probability of occupying the $|0\rangle$ basis state and a simultaneous nonzero probability of occupying the $|1\rangle$ basis state. Mathematically, a superposition of basis states means that the overall state of the qubit, denoted $|\Psi\rangle$, has the form $|\Psi\rangle = a|0\rangle + b|1\rangle$, where a and b are coefficients corresponding to the probabilities $|a|^2$ and $|b|^2$ of obtaining a $|0\rangle$ or $|1\rangle$ upon measurement, respectively. Coefficients a and b each have real and imaginary components. The quantum nature of a qubit is largely derived from its ability to form a coherent superposition of basis states. A qubit is in a coherent superposition as long as the amplitudes and phases of coefficients a and b are not affected by the outside environment. A qubit will retain this ability to exist as a coherent superposition of basis states when the qubit is sufficiently isolated from sources of decoherence.

To complete a computation using a qubit, the state of the qubit is measured (e.g., read out). Typically, when a measurement of the qubit is done, the quantum nature of the qubit is temporarily lost and the superposition of basis states collapses to either the $|0\rangle$ basis state or the $|1\rangle$ basis state, thus regaining its similarity to a conventional bit. The actual state of the qubit after it has collapsed depends on the probabilities $|a|^2$ and $|b|^2$ immediately prior to the readout operation. For more information on qubits, generally, see Nielsen and Chuang, 2000, *Quantum Computation and Quantum Information*, Cambridge University Press, Cambridge, pp. 344-345.

2.3 Superconducting Qubits

There are many different technologies that can be used to build quantum computers. One implementation uses superconducting materials. Superconducting qubits have the advantage of scalability. The possibility of realizing large scale quantum computers using superconducting qubits is promising since the technologies and processes involved in fabricating superconducting qubits are similar to those used for conventional silicon-based computers, for which there already exists infrastructure and technological know-how. Toward the realization of such a computer, Shnirman et al., 1997, *Physical Review Letters* 79, 2371-2374, proposed a superconducting quantum computer using Josephson junctions to produce the required quantum effects.

Superconducting qubits can be separated into several categories depending on the physical property used to encode information. A general division of qubits separates them into charge and phase devices, as discussed in Makhlin et al., 2001, *Reviews of Modern Physics* 73, pp. 357-400.

A superconducting qubit is typically characterized by two different types of energy, charging energy $E_c$, and Josephson energy $E_J$. The magnitude of each of these energy types in a given superconducting qubit depends on the physical parameters of the qubit. For example, the charging energy of a superconducting qubit is a function of the charging energies of the components (e.g., qubit junctions) of the qubit. The charging energy of a qubit junction, in turn, is defined as $e^2/(2C)$, where C is the capacitance of the junction. The Josephson energy of a superconducting qubit is a function of the Josephson energies of the components (e.g., qubit junctions) in the qubit. The Josephson energy of a qubit junction (e.g., Josephson junction), in turn, is related to the critical current of the qubit junction. Specifically, the Josephson energy of a qubit junction is proportional to the critical current $I_C$ of the junction and satisfies the relationship $E_J = (\hbar/2e)I_C$, where $\hbar$ is Planck's constant divided by $2\pi$. The ratio of the overall Josephson energy and the overall charging energy of a superconducting qubit can be used to classify superconducting qubits. For example, in one classification scheme, when the overall charging energy of a given superconducting qubit is much greater than the overall Josephson energy of the qubit, the qubit is deemed to be a charge qubit. And, when the overall Josephson energy of a given superconducting qubit is much greater than the overall charging energy of the qubit, the qubit is deemed to be a phase qubit. As used herein, the term "much greater" in the context of evaluating two energy terms means that one energy term may be anywhere from two times greater to more than twenty times greater than the second energy term.

In quantum systems based on qubits, phase and charge are conjugate variables. That is, a higher accuracy of determination of the phase leads to a greater uncertainty in the charge and vice versa. Charge qubits are said to operate in the charge basis (or regime), where the value of the charge is more localized, while phase qubits operate in the phase basis, where the value of the phase is more localized.

Charge qubits store and manipulate information in the charge states of the device, where elementary charges consist of pairs of electrons called Cooper pairs. A Cooper pair has a charge of 2e, where e is the elementary charge, and consists of two electrons bound together by a phonon interaction. See, for example, Nielsen and Chuang, 2000, *Quantum Computation and Quantum Information*, Cambridge University Press, Cambridge, pp. 344-345.

Phase qubits, on the other hand, store information in the phase or flux states of the qubit. Phase qubits include a superconducting loop interrupted by a Josephson junction. Phase qubits can be further distinguished as either flux qubits or "phase-only" qubits. Flux qubits are characterized by relatively large superconducting loops that can trap large fluxes on the order of the unit flux $\Phi_0=hc/2e$. See Bocko et al., 1997, *IEEE Trans. Appl. Superconduct.* 7 3638. "Phase-only" qubits, on the other hand, are characterized by a small inductance and are magnetically inactive. A "phase-only" qubit stores information in the form of a phase drop across a Josephson junction interrupting the superconducting loop. See, for example, Ioffe et al., 1999, *Nature* 398, 679.

Another type of qubit is the hybrid qubit. Hybrid qubits use both the charge and phase degrees of freedom to control information. Some examples of hybrid qubits are described in U.S. Pat. No. 6,838,694; and United States Patent Publication No. 2005-0082519, which are hereby incorporated by reference in their entireties.

2.4 Superconducting Flux Qubits

One proposal to build a quantum computer from superconducting qubits is Bocko et al., 1997, *IEEE Transactions on Applied Superconductivity* 7, p. 3638. See also, Makhlin et al., 2001, *Review of Modern Physics* 73, p. 357-400. Since then, many designs have been introduced. One such design is the persistent current qubit. The persistent current qubit is a form of flux qubit, meaning that it is a phase qubit that can store fluxes on the order of the unit flux $\Phi_0=hc/2e$. See Mooij et al., 1999, *Science* 285, 1036; and Orlando et al., 1999, *Physics Review B* 60, 15398. As illustrated in FIG. 6, the persistent current qubit comprises a loop of thick superconducting material interrupted by three small-capacitance Josephson junctions (denoted as "X" in FIG. 6) in series. The superconducting loop can enclose an applied magnetic flux $f\Phi_O$, wherein $\Phi_O$ is the superconducting-flux quantum h/2e, where h is Plank's constant. The value of the coefficient f can be controlled by an external magnetic bias and is usually kept at a value slightly smaller than 0.5. The critical current value of one Josephson junction, denoted $aE_J$ in FIG. 6, is engineered to be less than that of the critical current value $E_J$ of the other two Josephson junctions, which often have the same or very similar critical currents (which values are each denoted $E_J$ in FIG. 6). Typically, a is in the range 0<a<1. The persistent current qubit can be built such that the loop of superconducting material encloses a small area, (e.g., less than ten microns squared).

The persistent current qubit is well known and has demonstrated long coherence times. See, for example, Orlando et al.; and Il'ichev et al., 2003, *Physics Review Letters* 91, 097906. Some other types of flux qubits comprise superconducting loops having more or fewer than three Josephson junctions. See, e.g., Blatter et al., 2001, *Physics Review B* 63, 174511; and Friedman et al., 2000, *Nature* 406, 43.

The sign of the coupling interaction in the system Hamiltonian that describes the coupling of two superconducting flux qubits can be used as a basis for classifying qubit coupling types. According to such a classification scheme, there are two coupling types, ferromagnetic and anti-ferromagnetic.

Flux qubits typically interact via their respective magnetic fluxes. That is, a change in flux in a first superconducting flux qubit will cause a change in flux in a second superconducting flux qubit that is coupled to the first superconducting flux qubit. In ferromagnetic coupling, it is energetically favorable for a change in flux of the first superconducting flux qubit to produce a similar change in the flux of a second superconducting flux qubit to which the first superconducting flux qubit is coupled. For example, an increase in flux in the first qubit will cause an increase in flux in the second qubit when the two qubits are ferromagnetically coupled. Since circulating loop currents generate flux within the superconducting loop of a flux qubit, ferromagnetic coupling can also mean that circulating current in one qubit will generate current flowing in the same direction in another qubit.

In the anti-ferromagnetic case, it is energetically favorable for a change in flux of a first superconducting flux qubit to produce a similar but opposite change in flux in a second superconducting flux qubit to which the first superconducting flux qubit is coupled. For example, a flux increase in one qubit leads to a flux decrease in the anti-ferromagnetically coupled device. Likewise, a circulating current in one direction in a first flux qubit causes a current flow in the opposite direction in the flux qubit that is anti-ferromagnetically coupled to the first qubit because it is more energetically favorable. By energetically favorable, it is meant that the system comprising the coupled qubits prefers to be in a specific coupling configuration (because the overall energy of the coupled system is lower in the specific configuration than in other configurations).

In the Hamiltonian of two flux devices coupled together, $\sigma_z \otimes \sigma_z$ represents the "sigma z" coupling between two devices with a variable J as a pre-factor that indicates the strength of the coupling. When J>0, the coupling is anti-ferromagnetic, with a higher J meaning a stronger anti-ferromagnetic coupling. When J<0, the coupling is ferromagnetic, with a lower J meaning a stronger ferromagnetic coupling. When J=0, there is no coupling. Thus, switching the sign of J switches the type of coupling from ferromagnetic to anti-ferromagnetic or vice versa.

2.5 Measurement Techniques for Qubits

Generally, qubit measurement is conducted based on the assumption that the qubit can be in a quantum state. However, qubits can be restricted to hold only classical states and then measured when in this restricted state. Regardless of whether measurement relies on the assumption that the qubits to be measured are in a quantum state or on the assumption that they have been restricted to a classical state, methods and structures in the art that can measure a large number of qubits in the same circuit are lacking. Usually, a readout mechanism for one qubit requires a certain amount of circuit board space, as well as at least one control wire to operate the mechanism. Traditionally, for every additional qubit in a circuit, an additional readout mechanism for that qubit is used, as well as at least one additional control wire. This creates a problem in circuit design when a large number of qubits are present, since space constraints make placement of qubits in a circuit very complex. Also, the presence of additional control wires creates a problem in finding an efficient routing of all the wires in the circuit. In an array with a large number of qubits, reading out the qubits in the interior of the array can be challenging due to restrictions in area and wiring paths into the interior of the array.

Il'ichev et al., referenced above, proposed a method to read out the state of a flux qubit by weakly coupling the flux qubit to a tank circuit. When the qubit is ready for measurement, the qubit is brought into resonance with the tank circuit so that the state of the qubit and the state of the tank circuit couple. The tank is then decoupled from the qubit. This method, although it reduces dissipation of the qubit by the tank circuit when not reading out, is not scalable to higher numbers of qubits in a quantum circuit, because having a single tank circuit for each qubit is not feasible.

One way of measuring a flux qubit is through the use of a superconducting quantum interference device, or SQUID, inductively coupled to the flux qubit. A SQUID comprises a superconducting loop interrupted by at least one Josephson junction. The current flowing in the loop of the SQUID can be biased in several different ways. Two examples of SQUIDs that differ in the way they are biased are dc-SQUIDs and rf-SQUIDs. Since flux devices interact via their magnetic fluxes, a SQUID-type device can be used to couple flux qubits together, like the scheme suggested by Majer et al., 2003, arXiv.org:cond-mat/0308192. When used to measure the state of a flux qubit, the SQUID's supercurrent is read out because this supercurrent is dependent on the state of the qubit. As such, a measurement of the SQUID's current can determine the state of the qubit to which the SQUID is coupled. However, SQUIDs have the drawback that they take up a considerable amount of surface area on a circuit board or chip. For higher numbers of qubits, having a SQUID for each qubit becomes cumbersome and space consuming.

Paternostro et al., 2005, Physical Review A 71, 042311, (hereinafter "Paternostro") disclose a method of transferring a quantum state of a qubit through a multi-qubit coupling via a bus system. Paternostro combines quantum optics and SQUIDs in order to create a network of spin chains on which quantum operations can be performed. However, including a bus to couple all the qubits together can introduce increased noise interference into the system.

2.6 State of the Art

Given the above background, there exists a need in the art to provide systems and methods for efficiently reading out the classical state of qubits in an array, especially qubits in the interior of the array.

3. BRIEF DESCRIPTION OF THE DRAWINGS

4. SUMMARY OF THE INVENTION

Figures 1A, 1B:
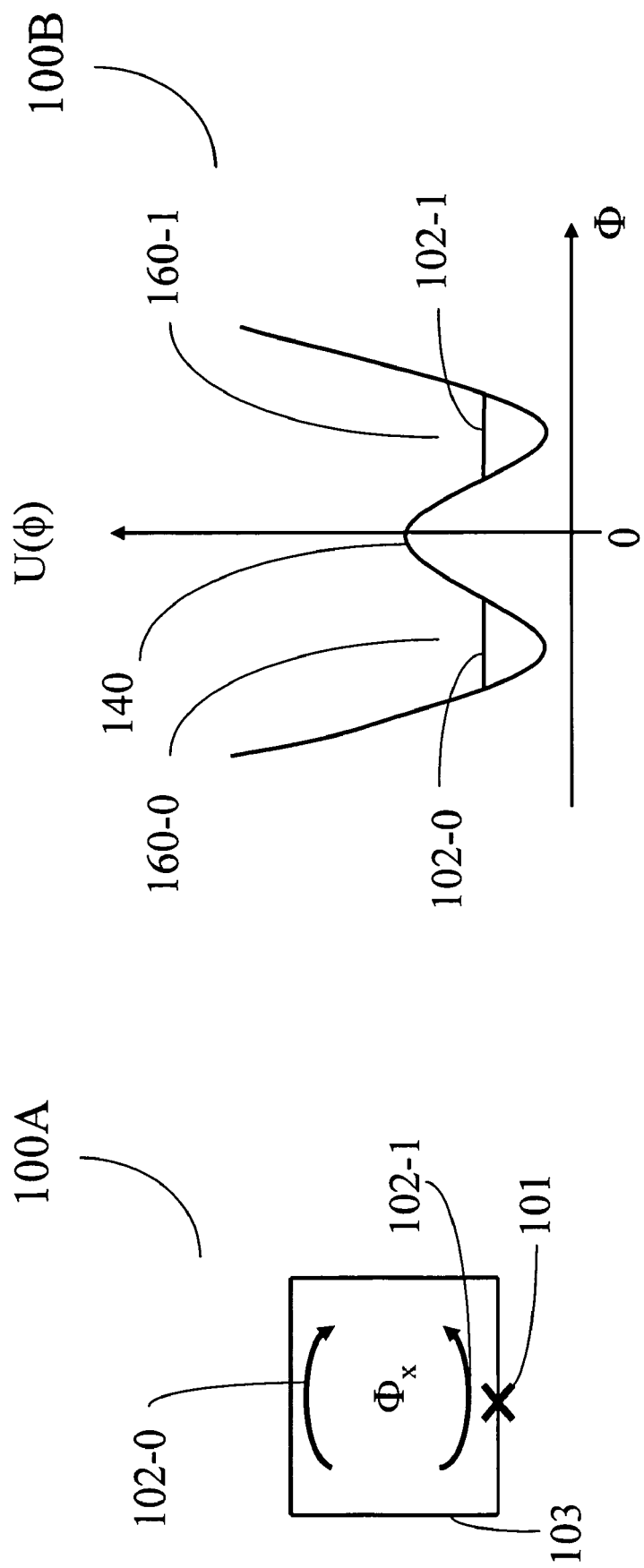
FIG. 1A illustrates the two circulating current states of an rf-SQUID.
FIG. 1B illustrates the energy landscape of the rf-SQUID in FIG. 1A.

In one embodiment, a method of copying a classical state of a first qubit to a second qubit is provided. The method comprises initializing the second qubit to an initial classical state. The second qubit has a potential energy configuration comprising a first potential well having a first potential minimum and a second potential well having a second potential minimum. The initial classical state is located in the first potential well. In the method the first potential minimum of the first potential well is adjusted to a third potential minimum that is higher than the second potential minimum of the second potential well. The method further comprises coupling the first qubit and the second qubit for a duration t.

In another embodiment, a method of copying a classical state of a first qubit to a second qubit is provided. The first qubit is characterized by a potential energy configuration that comprises a first tunneling barrier, and the second qubit is characterized by a potential energy configuration that comprises a second tunneling barrier. The method comprises lowering the second tunneling barrier, coupling the first qubit and the second qubit for a duration t, and raising the second tunneling barrier.

In yet another embodiment, a method for reading out a classical state of a qubit in an array of qubits is provided. The array comprises perimeter qubits and interior qubits. The method comprises initializing a classical state of a perimeter qubit having an associated readout device, copying a classical state of an interior qubit to the perimeter qubit, and reading out the classical state of the interior qubit by reading out the classical state of the perimeter qubit. The perimeter qubit is coupled to the interior qubit via a coupling device having a coupling strength. Further, the coupling strength is adjustable between a minimum coupling strength and a predetermined coupling strength.

In still another embodiment, a method of copying a classical state of a first qubit means to a second qubit means is provided. The method comprises means for coupling the first qubit means to the second qubit means, means for adjusting at least one of a tunneling barrier of the first qubit means and a tunneling barrier of the second qubit means, and means for adjusting a symmetry of a potential energy configuration of at least one of the first qubit means and the second qubit means.

In still another embodiment, a system for copying a classical state of a first qubit to a second qubit is provided. The first qubit is characterized by a potential energy configuration that comprises a first tunneling barrier, and the second qubit is characterized by a potential energy configuration that comprises a second tunneling barrier. The system comprises a first barrier adjustment module, a coupling module, and a second barrier adjustment module. The first barrier adjustment module comprises instructions for lowering the second tunneling barrier. The coupling module comprises instructions for coupling the first qubit to the second qubit. The second barrier adjustment module comprises instructions for raising the second tunneling barrier.

In still another embodiment, a computer-readable medium storing executable instructions for initializing a first qubit to an initial classical state is provided. In this embodiment, the first qubit has a potential energy configuration comprising a first potential well having a first potential minimum and a second potential well having a second potential minimum, and the initial classical state is located in the first potential well. The computer-readable medium further stores executable instructions for adjusting the first potential minimum of the first potential well to a third potential minimum that is higher than the second potential minimum of the second potential well. The computer-readable medium further stores executable instructions for coupling the first qubit and the second qubit for a duration t.

5. DETAILED DESCRIPTION

As will be described in further detail below, the present methods and systems provide for copying the classical state of a first qubit to a second qubit. In some embodiments, the first and second qubits are coupled and the escape probability of the second qubit is tuned. In other embodiments, the tunneling barrier of the second qubit is initialized to a high value and decreased, the qubits are coupled, and then the tunneling barrier of the second qubit is raised to copy the state of the first qubit.

The present methods and systems may also provide for reading out the states of an array of qubits. In some embodiments, the array may be two-dimensional, with the qubits in the outer perimeter of the array being read out using techniques known in the art. The states of qubits adjacent to the perimeter qubits are then copied using the present methods and systems to corresponding adjacent qubits in the outer perimeter of the array. Once copied, the states are read out using techniques known in the art, thereby providing a mechanism for reading out the state of qubits in the interior of the array. In some instances, this process continues with qubits increasingly deeper in the interior of the array until the entire array has been read out. Readout of qubits in the interior of the array may be done multiple times to increase accuracy of measurement.

Qubits, such as flux qubits, function as two-level systems. That is, a qubit has two distinct states that hold information. For example, an rf-SQUID 100A, which can be used as a flux qubit, is shown in FIG. 1A. The rf-SQUID 100A comprises a main superconducting loop 103 interrupted by Josephson junction 101. The two distinct states of rf-SQUID 100A are the two directions of circulating current around the loop, respectively shown as arrows 102-0 and 102-1. rf-SQUID 100A can be in either a classical state, where current is flowing in one direction only in the superconducting loop, or in a quantum superposition of states, where current is flowing in both directions at the same time in the superconducting loop. FIG. 1B shows the corresponding energy diagram for rf-SQUID 100A. The potential energy landscape 100B is a bistable potential with two minima 160-0 and 160-1 and an energy barrier 140. Minima 160-0 and 160-1 can be degenerate, meaning that they have the same energy, in some instances. In other instances, minima 160-0 and 160-1 are not degenerate. When the minima are degenerate, the energy landscape is referred to as symmetric. Current directions 102-0 and 102-1 in FIG. 1A respectively correspond to potential wells 160-0 and 160-1 in the minima of FIG. 1B. However, this specific correspondence is arbitrary. Using this correspondence, a qubit having the classical state corresponding to current 102-0 of FIG. 1A is said to be located in the left potential well, well 160-0 of FIG. 1B. Similarly, a qubit having the classical state corresponding to current 102-1 of FIG. 1A is said to be located in the right potential well, well 160-1 of FIG. 1B.

The state of qubit 100A can tunnel quantum mechanically through energy barrier 140 from one minimum to the other. The frequency of this tunneling depends on the height of the barrier. If the barrier is high, less tunneling occurs. If the barrier is low, tunneling occurs more often. When little or no tunneling occurs (high barrier), the qubit is said to be in the classical regime. When the tunneling rate is high (low barrier), the qubit is said to be in the quantum regime. When a qubit holds a classical state, it is meant that the state of the qubit is entirely localized in one well and is not in a superposition of both wells.

Figure 1C:
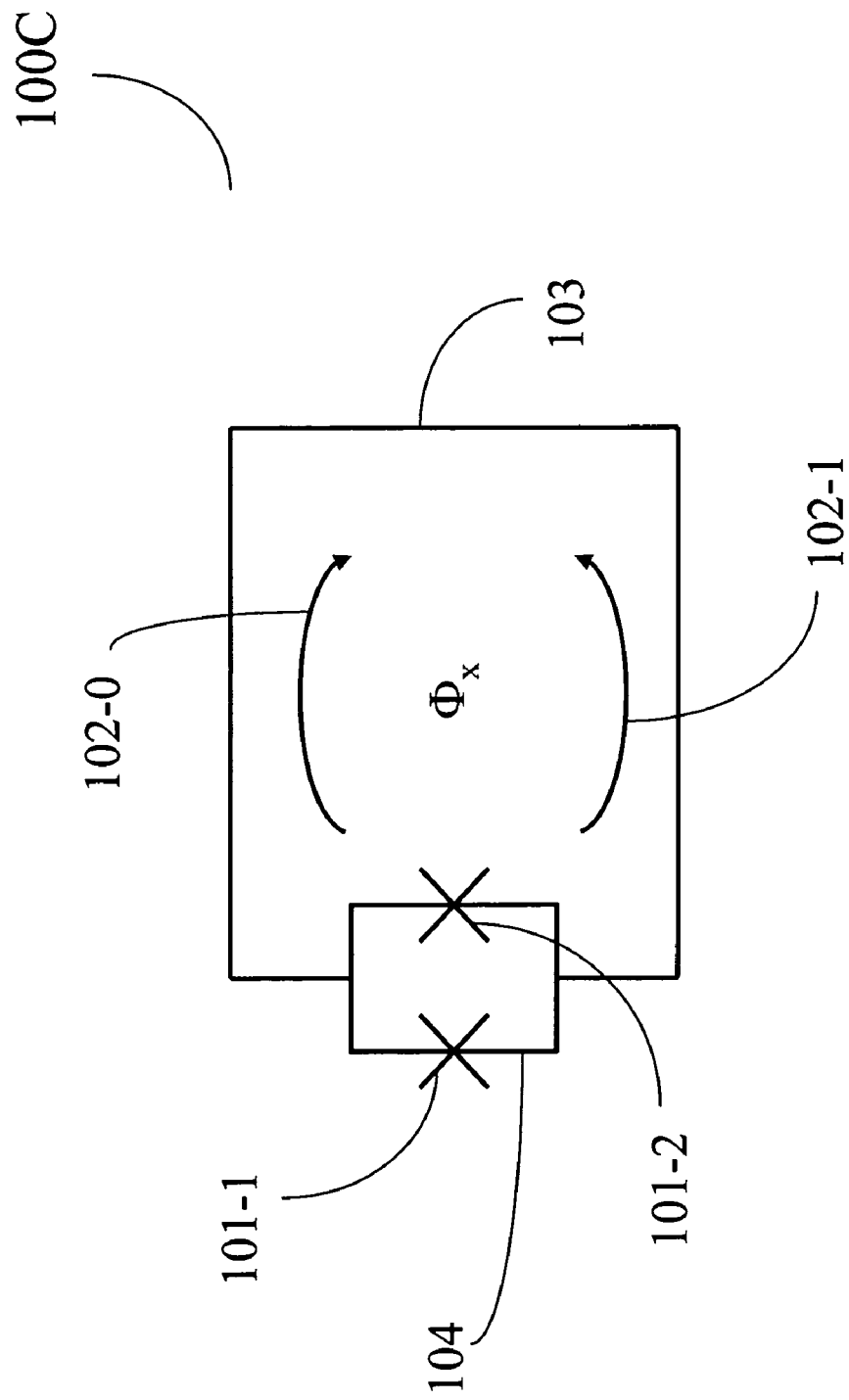
FIG. 1C illustrates a split junction flux qubit, in accordance with the prior art.

Energy landscape 100B can be tuned by changing the bias parameters of rf-SQUID 100A. For example, tuning the Josephson energy of the qubit can change the height of the energy barrier 140. To be able to tune the Josephson energy of junction 101, two Josephson junctions in a small loop, known as a split junction, can replace single junction 101. An example of a split junction flux qubit 100C is shown in FIG. 1C. It comprises two Josephson junctions 101-1 and 101-2 that form a small superconducting loop 104 in addition to main loop 103. Tuning the magnetic flux in small loop 104 of the split junction changes the effective Josephson energy of the split junction. One can also tune the Josephson energy of junction 101 by applying a transverse (in-plane) magnetic flux through Josephson junction 101. The potential minima of wells 160-0 and 160-1 can be changed relative to one another by adjusting the magnitude of the magnetic flux $\Phi_x$ that is applied to main loop 103. To make such an adjustment, magnetic field flux can be applied by an inductive bias loop (not shown) that is proximate to qubit 100C. The strength of the magnetic moment produced by the circulating current in main loop 103 can be tuned by changing the Josephson energy of Josephson junction 101, which is done using methods such as those described above. These features allow greater flexibility in the behavior of rf-SQUID 100C.

Initializing a flux qubit means that the qubit is put into a known state using, for example, initialization methods known in the art. This is usually done before the start of a quantum operation involving the qubit. To initialize an rf-SQUID, such as 100A illustrated in FIG. 1A, to a classical state, the state of the qubit is localized to one of its potential wells (e.g., well 160-0 or well 160-1). One way to accomplish this is to make the energy landscape highly non-degenerate. For example, if the qubit is to be initialized to potential well 160-1, the energy minimum of potential well 160-0 is raised to a value slightly lower than the height of energy barrier 140, thus making well 160-0 "shallow" compared to well 160-1. Adjusting the amount of flux applied to the superconducting loop of the qubit can raise the potential energy minimum of well 160-0. Well 160-0 can be made to be only slightly lower than energy barrier 140. As used here, in some instances, the term "slightly lower" means that the value of the potential energy minimum of well 160-0 is within about eighty to ninety percent of the value of energy barrier 140. In such an unstable state, there is a high probability that tunneling will occur and that the state of the qubit will be localized to well 160-1. Note that, in such a scenario, the potential energy of well 160-1 is much lower than energy barrier 140, so no tunneling will occur out of well 160-1. Once the state of rf-SQUID 100A has been localized to well 160-1, well 160-0 is lowered to about its original value.

Methods for reading out the state of flux qubits like rf-SQUID 100A are well known in the art. However, readout schemes proposed so far are useful only for a small number of qubits and are not scalable. If a large number of qubits were present in a circuit, the space and wiring constraints would render these schemes ineffective. Since it is preferable to be able to read out the state of any qubit in a quantum computer or quantum processor, systems in which each qubit has an associated readout device are desired.

One characteristic of the present methods and systems is the absence of any requirement that each qubit in a group of qubits have a readout device for the states of all qubits to be measured. If the states of the qubits were classical, which can be achieved by raising the tunneling barrier 140 between the two states of the qubit as described above, then the states of qubits without readout devices can be copied to qubits that do have readout devices. Such a technique does not violate the quantum "no-copy" rule, which states that a quantum state cannot be copied exactly. Since the qubit is in a classical state, meaning that it is not a superposition of two states, there is no physical obstacle that prevents the copying of the state. Aspects of the present methods and systems include two techniques for inductively copying the classical state from one qubit to another.

Ferromagnetic State Copying

Figure 2:
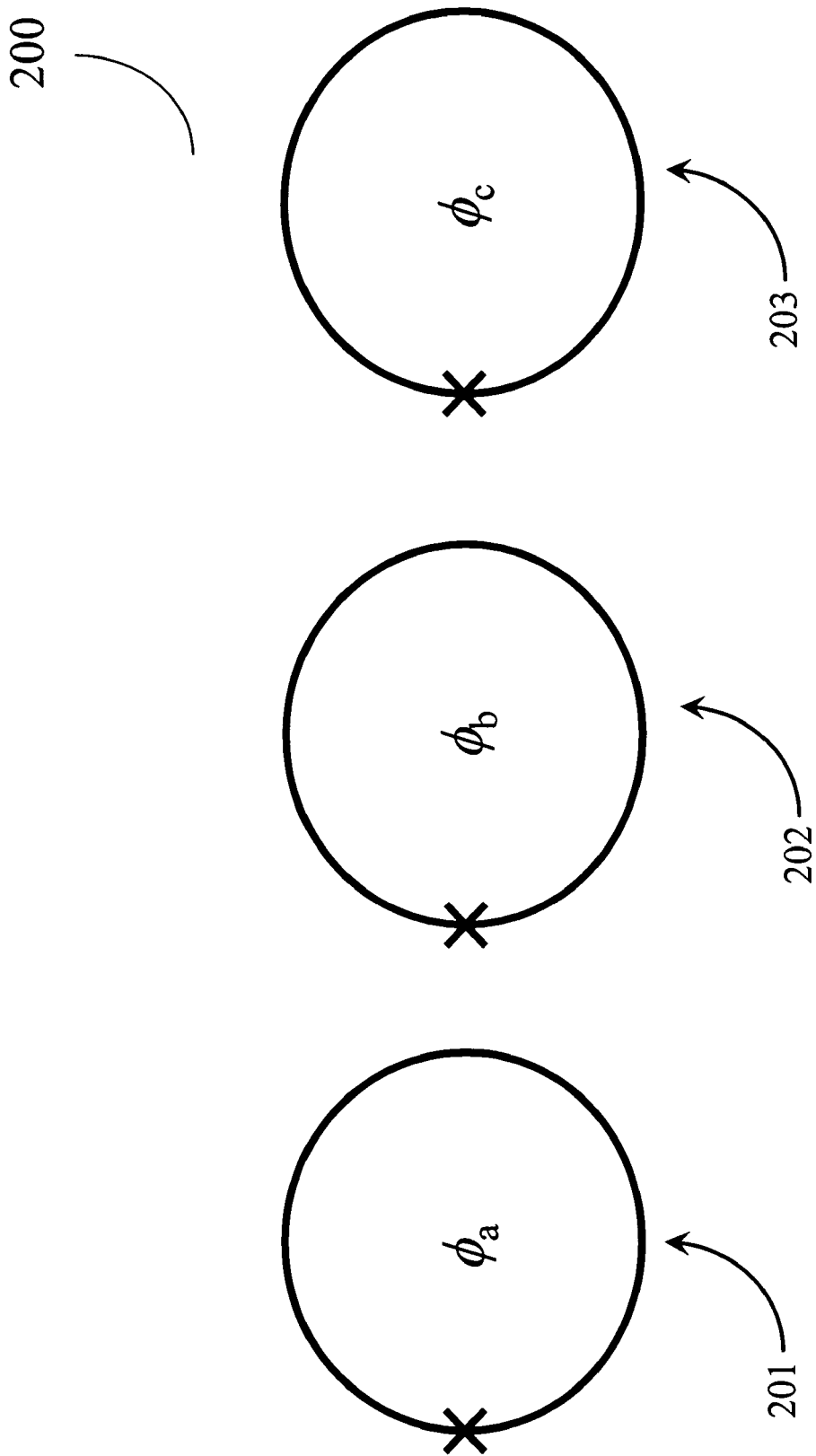
FIG. 2 illustrates two flux qubits and a coupling device in accordance with an embodiment of the present methods and systems.

FIG. 2 shows two rf-SQUID flux qubits 201 and 203 and an rf-SQUID coupling device 202 that can couple the qubits ferromagnetically or anti-ferromagnetically, or tune the coupling close to zero. Other inductive coupling devices, like dc-SQUIDs or flux transformers, can be used in place of rf-SQUID 202, as long as the device still fulfills the attributes of the coupling device described herein. Coupling device 202 may provide tunable coupling, and may include a split junction. Likewise, other types of flux qubits, like the persistent current qubit of Orlando et al., 1999, Physics Review B 60, 15398, which is hereby incorporated herein by reference can be used in place of rf-SQUIDs 201 and 203. Qubits 201 and 203 may each comprise an rf-SQUID with a split junction.

Figure 3A:
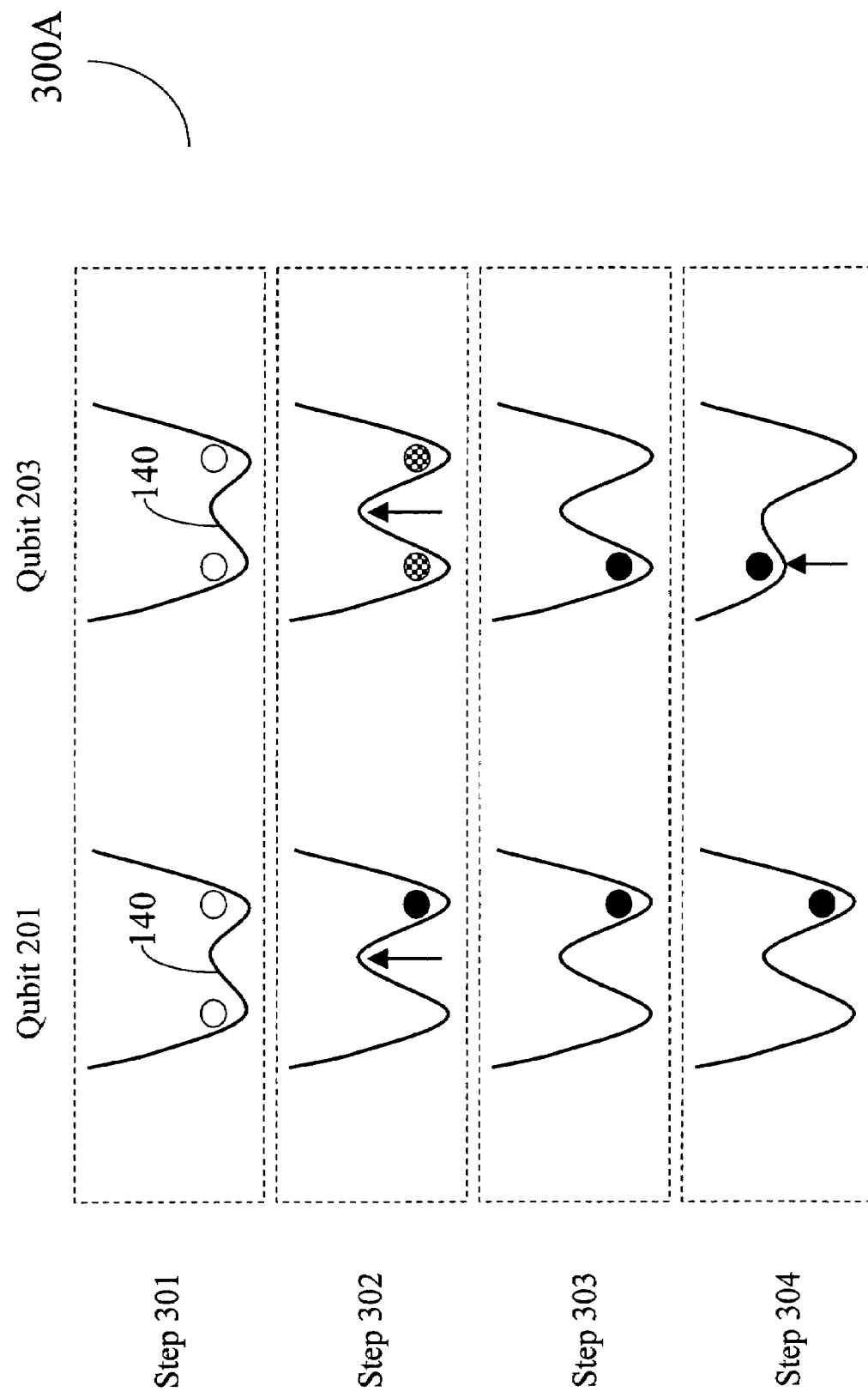
FIG. 3A illustrates sequential steps involved in ferromagnetic state copying in accordance with an embodiment of the present methods and systems.
Figure 3B:
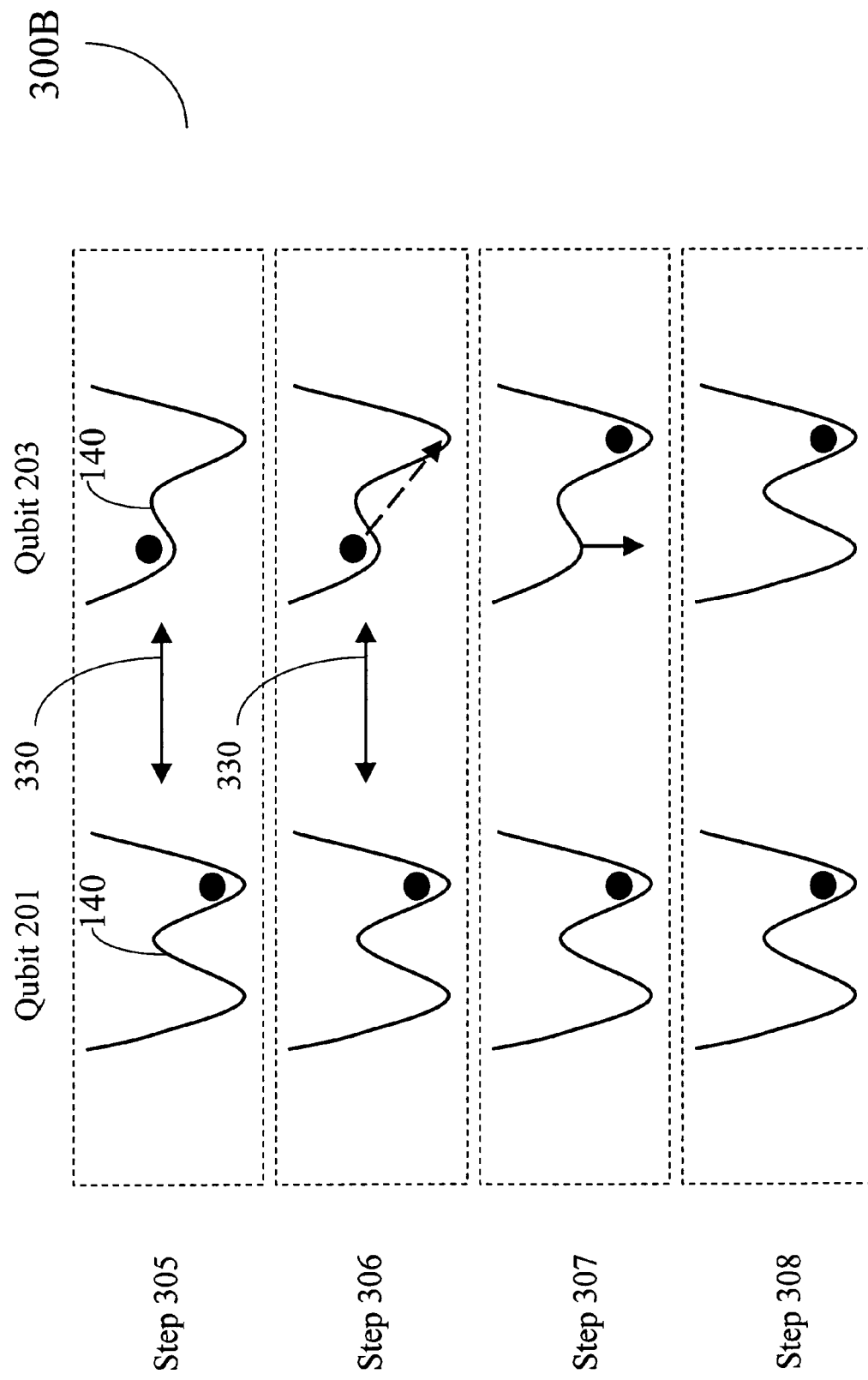
FIG. 3B illustrates sequential steps that follow the steps of FIG. 3A involved in ferromagnetic state copying in accordance with an embodiment of the present methods and systems.

The ferromagnetic state copying method for copying the classical state of qubit 201 to qubit 203 is illustrated in FIGS. 3A and 3B, with the steps of FIG. 3B sequentially following the steps of FIG. 3A. FIGS. 3A and 3B illustrate the energy landscape of qubits 201 and 203 as well as the state of these qubits at different points in the method. The energy landscape of both qubits 201 and 203 is a bistable potential, which comprises two potential minimum wells (the left and right wells shown in each of the potential energy diagrams of FIGS. 3A and 3B).

Step 301. Step 301 shows the initial condition of the qubits, which is usually at the end of a calculation or evolution. The states of qubits are not known, and thus the state of the qubits is represented by unfilled circles in both minima of the energy landscape of both qubits. Energy barrier 140 between the minima may or may not be low enough to allow quantum tunneling between the minima. Qubits 201 and 203 may be degenerate, or nearly degenerate.

Optional step 302. When the state of qubit 201 is to be copied to qubit 203, the energy barrier 140 of both qubits may be raised to a high enough value to prevent quantum tunneling from occurring, effectively projecting the state of the qubits to one of the classical basis states. This is illustrated in step 302. If the energy barriers are already high enough to prevent tunneling at the end of step 301, step 302 can be omitted. Black circles used throughout FIGS. 3A and 3B denote the localization of the state of a qubit to a single well. Thus, the black circle in qubit 201 in step 302 indicates that the state of the qubit is localized in the right well. This choice of localization to the right well as opposed to localization to the left well in the illustration of step 302 of the inventive method is arbitrary and only for illustrative purposes. In practice, the identity of the well to which the state of the qubit is localized will depend on the quantum operations or time evolution performed on the qubit before step 301. Raising energy barrier 140 of a qubit can be achieved by tuning the Josephson energy of the qubit, for example, using any of the techniques that have been previously described. The patterned circles in qubit 203 in step 302 indicate that the state of qubit 203 is located in one of the wells, but which well it is in is not significant.

Step 303. After energy barriers 140 have been raised in optional step 302, any couplings between qubits 201 or 203 and other devices are reduced to zero or near zero in order to prevent further interactions that might change the state of the qubits. Reducing the coupling to zero or near zero may be done concurrently with the raising of energy barriers 140. Thus, steps 302 and 303 may be done at the same time. There may be an initial ferromagnetic coupling between qubits 201 and 203 and it is the only coupling not reduced to zero (or close to zero) during step 303. In step 303, qubit 203 is arbitrarily initialized to one of the wells. This can be done, as described previously, by raising one of the potential wells, thereby localizing the state of the qubit to the other well that has lower potential energy. This raising step is not illustrated in FIG. 3A. As illustrated in FIG. 3A, the state of qubit 203 was initialized to the left well, but this choice is arbitrary. The qubit could have been initialized in the right well.

Step 304. In step 304, the potential minimum of the well that qubit 203 is initialized to is raised. In this case, the left well is raised. In other words, the minimum potential energy of the left well is raised so that the bistable potential of qubit 203 has a shallow well (left) and a deep well (right). Raising the minimum potential energy in the left well to a value close to but less than the energy barrier height 140 increases the probability that qubit 203 will tunnel through the barrier from the left well into the right well. However, tunneling from the right well to the left well is highly improbable. Changing the depth of the well can be achieved by tuning the magnetic flux through the superconducting loop of the qubit. If qubit 203 were initialized to the right well then, in step 304, the potential minimum of the right well would be raised.

Optional step 305. In step 305, a strong ferromagnetic coupling 330 is introduced between qubits 201 and 203 if there is no coupling already present. Coupling 330 can be introduced by turning on a coupling device between qubits 201 and 203, like rf-SQUID coupling device 202 in FIG. 2. In some cases, a strong coupling may be defined as a maximum potential coupling strength that coupling device 202 can achieve, and a strong ferromagnetic coupling may be defined as a coupling strength that is equivalent to J=−1 in the Hamiltonian of the coupled system, where J is the pre-factor of the qubit coupling term. In the case where a ferromagnetic coupling is already present between qubits 201 and qubit 203 before step 305, for example when coupling device 202 is already on, step 305 can be omitted. When a ferromagnetic coupling between the qubits is applied, it is energetically favorable for the states of both qubits to be the same. Since the energy barrier of qubit 201 is high, qubit 201 cannot change states. However, the state of qubit 203 is heavily influenced by the state of qubit 201 through ferromagnetic coupling 330.

Step 306. In the illustrated example, the state of qubit 201 is in the right well and the state of qubit 203 is in the shallow left well. Therefore, qubit 203 will tunnel through the energy barrier into the lower right well in order to reduce the energy of the coupled system, as shown in step 306. This is because ferromagnetic coupling 330 causes it to be energetically more favorable for both qubits to hold the same state. Since tunneling in qubit 201 cannot occur due to its high tunneling barrier, only qubit 203 is able to change its state in order to match the state of qubit 201. If, on the other hand, the state of qubit 201 was in the left well (not shown), qubit 203 would not tunnel but instead would stay in the left well with a large probability (not shown). There is a small probability that qubit 203 would still tunnel in this case. To eliminate copying errors due to errant tunneling, multiple copy operations can be performed and averaged.

Optional step 307. Ferromagnetic coupling 330 is removed in optional step 307. Alternatively, ferromagnetic coupling 330 may not be removed, in which case step 307 is omitted.

Step 308. The minimum of the left well of qubit 203 is lowered (e.g., to its original value) in step 308. This is achieved by biasing the magnetic flux through a loop of qubit 203. Thus, at the end of step 308, the state of qubit 203 is the same as the state of qubit 201. The classical state of qubit 201 has been copied to qubit 203. The time interval in which steps 304 and 308 are completed (that is, the process of raising and lowering the potential) is called the tipping time. Those of ordinary skill in the art will appreciate that the selection of a suitable tipping time may vary. In some cases, the tipping time may be between about 1 ns and 800 μs, e.g. 10 μs.

By way of illustration, a numerical example of the strength of coupling is presented. Qubits 201 and 203 are rf-SQUIDs, each with a loop size of 25 μm×25 μm, a loop inductance of 50 pH, and characterized by a critical current of 15 μA. Coupling device 202 is an rf-SQUID with a loop size of 25 μm×25 μm, a loop inductance of 50 pH, and a critical current of 5.5 μA. The mutual inductance between qubit 201 and coupling device 202 is approximately 3 pH and the spacing between them is about 1 μm. The mutual inductance between qubit 203 and coupling device 202 is approximately 3 pH and the spacing between them is about 1 μm.

Let the magnetic flux applied to the superconducting loop of both qubits be kept at $\Phi_0/2$, where $\Phi_0$ is the magnetic flux quantum. When the qubits are biased at this amount, the difference in circulating current between their classical states is around 26 μA. Coupler 202 is turned on and biased to provide ferromagnetic coupling between the qubits. When the state of one qubit (say 201) is switched, this produces an anti-ferromagnetic coupling between qubit 201 and coupling device 202. The change in circulating current in the coupler due to qubit 201 switching states is around 7 μA. This corresponds to a change in flux in the coupler of $0.038\Phi_0$. Likewise, this change in flux in the coupling device produces a change in flux in the other qubit (203) of around $0.01\Phi_0$ due to anti-ferromagnetic coupling. Although the qubits are coupled anti-ferromagnetically to the coupling device, the qubit-qubit coupling mediated by the coupling device is ferromagnetic in nature. This coupling is strong enough such that the state copying fidelity of a copying operation is greater than 99.999% at sufficiently low temperature (<100 mK). The spin copying operation can be performed multiple times to increase the overall copying fidelity, if required.

Adiabatic State Copying

Figure 4A:
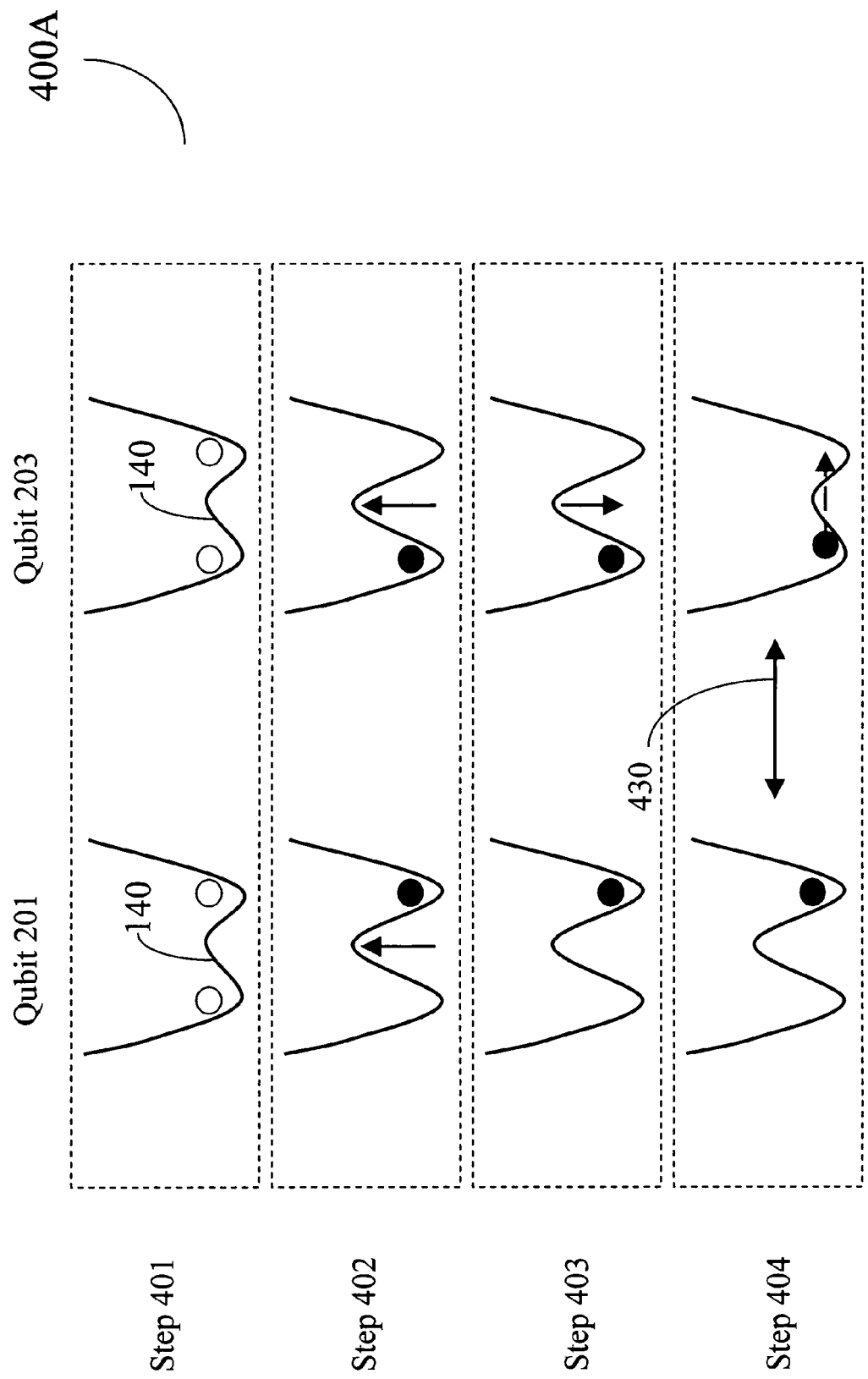
FIG. 4A illustrates sequential steps involved in adiabatic state copying in accordance with an embodiment of the present methods and systems.
Figure 4B:
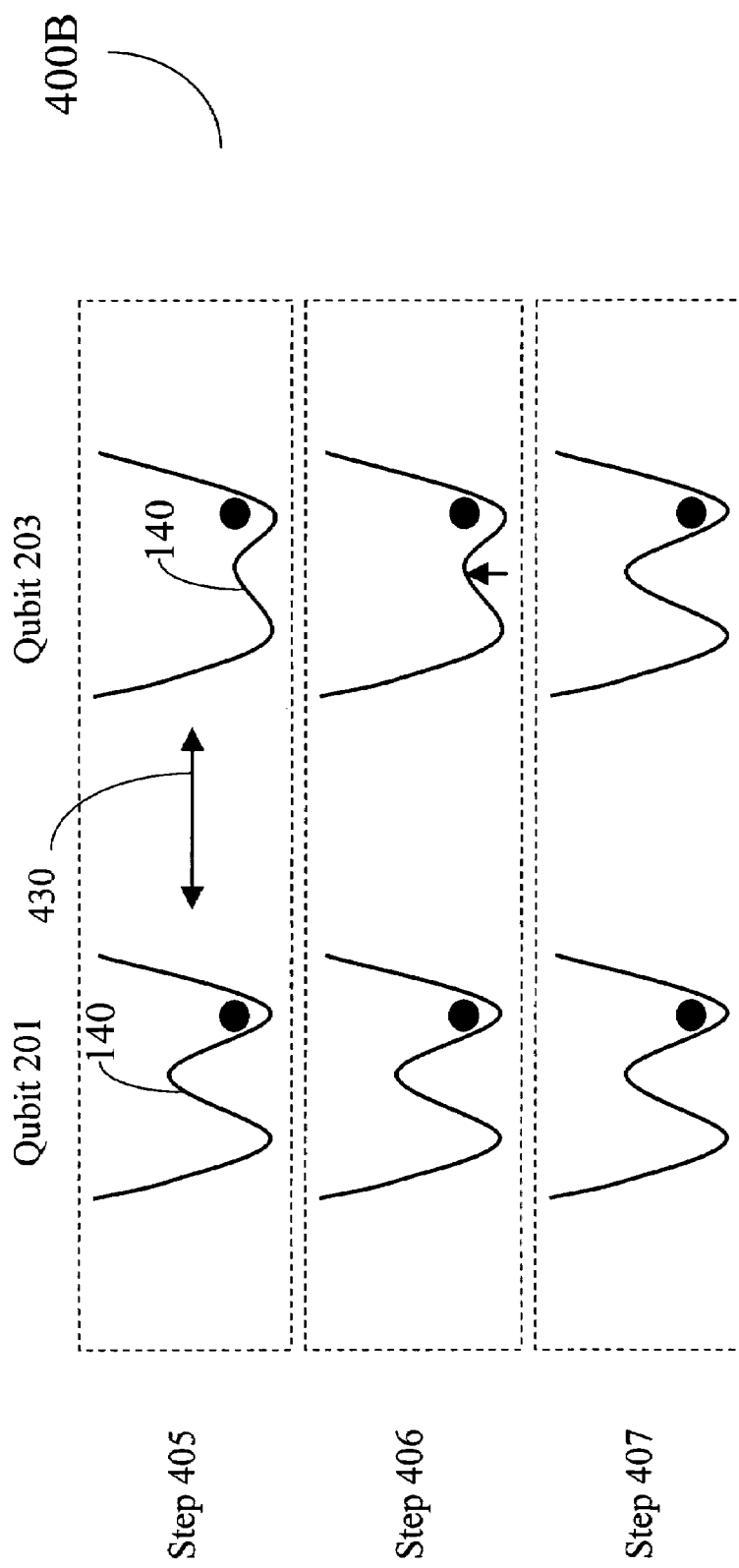
FIG. 4B illustrates sequential steps that follow the steps of FIG. 4A involved in adiabatic state copying in accordance with an embodiment of the present methods and systems.

An embodiment of the present methods and systems for adiabatically copying the classical state of one qubit to another, like from qubit 201 to qubit 203 in FIG. 2, is illustrated in FIGS. 4A and 4B, with the steps in FIG. 4B sequentially following the steps of FIG. 4A. The energy landscape of both qubits is a bistable potential, like the one illustrated in FIG. 1B, and may or may not be degenerate.

Step 401. Step 401 shows the initial condition of the qubits, which is usually at the end of a calculation or evolution. There is no requirement that the state of the qubits be known in step 401. Thus, the state of qubits 201 and 203 is represented by unfilled circles in both minima of the bistable potential for both qubits in FIG. 4A. The energy barrier between the minima may or may not be low enough to allow quantum tunneling between the minima.

Optional step 402. If the state of qubit 201 is to be copied into qubit 203, the energy barrier of both qubits is raised to a high enough value to prevent quantum tunneling from occurring, effectively projecting the state of the qubits to one of the classical basis states. This is illustrated in step 402. If the energy barriers are already high enough to prevent tunneling, then step 402 can be omitted. The black circle in qubit 201 in step 402 represents the state of qubit 201 as being localized in the right well. This choice is arbitrary and only for illustrative purposes. In practice, the state of qubit 201 will depend on the calculation or time evolution performed on it prior to step 401. Raising the energy barrier in each qubit can be achieved by tuning the Josephson energy of qubit 201 and of qubit 203. In FIG. 4A, qubit 203 is localized in the left well, but this choice is only for illustrative purposes. In practice, the state of qubit 203 can be in either well at the end of step 402. Both qubits are biased with a flux equal to half a flux quantum (e.g. the qubits are within their hysteresis region, that is, the region where changing the qubit's flux bias does not cause a change of its classical state), and this bias is maintained throughout the process. After the barriers are raised, any couplings between qubit 201 or 203 and other devices are reduced to zero (or close to zero). The reduction of the coupling to external devices to zero (or close to zero) and the raising of the energy barriers may be done concurrently. In some cases, there may be an initial ferromagnetic coupling between qubits 201 and 203 and it is the only coupling not reduced to zero (or close to zero).

Step 403. In step 403, the energy barrier of qubit 203 is adiabatically reduced to bring the qubit from the classical regime to the quantum regime. Reducing the height of the barrier can be achieved by tuning a magnetic field transverse to qubit 203 or by tuning the Josephson energy of the qubit. The minimum amount of time needed to achieve step 403 is the amount of time needed to sufficiently guarantee that unwanted tunneling events will not be induced. Those of ordinary skill in the art will appreciate that the time needed for step 403 will vary. For example, in some cases it may be between about 1 ns and 1 ms, e.g. 100 μs. The height of the barrier may be reduced to zero or near zero. Once qubit 203 is brought into the quantum regime, tunneling between the potential wells of the qubit can occur.

Step 404. A strong ferromagnetic coupling 430 is introduced between qubits 201 and 203 in step 404. In some cases, a strong ferromagnetic coupling may be defined as a coupling strength that is equivalent to J=−1 in the Hamiltonian of the coupled system, where J is the pre-factor of the qubit coupling term. In the case where no coupling exists between qubits 201 and 203 prior to step 404, step 404 comprises turning on coupling device 202. In the case where a ferromagnetic coupling is already present between qubits 201 and qubit 203 before step 404 (coupling device 202 is already on), then step 404 can be omitted. When a ferromagnetic coupling is applied, it is energetically favorable for the states of both qubits to be the same. Since energy barrier 140 of qubit 201 is high, qubit 201 cannot change states. However, since the energy barrier of qubit 203 is low, it is possible for the state of qubit 203 to tunnel from one well to the other. Thus, if the state of qubit 203 is in the left well (and the state of qubit 201 is in the right well as depicted in step 404 of FIG. 4A), the coupling would cause the qubit to tunnel into the right well. If the state of qubit 203 is in the right well in step 404 (not shown), then no tunneling would occur since the qubit is already in the energetically favorable state. The method would work in a similar fashion if the state of qubit 201 was in the left well (not shown), with the state of qubit 203 tunneling into the left well if not already in the left well.

Step 405. In step 405, it is shown that qubit 203 has localized in the same state as qubit 201 due to ferromagnetic coupling 430.

Step 406. In step 406, the energy barrier of qubit 203 is adiabatically returned to a level that reduces the amount of quantum tunneling permitted, thus transitioning the qubit from the quantum regime back into the classical regime. This prevents qubit 203 from tunneling out of the state it was at the end of step 405. Also, ferromagnetic coupling 430 can be removed if desired. The time taken to complete step 406 is long enough so as to not induce unwanted tunneling events, and may be of the same order as step 403.

Step 407. In step 407, qubit 203 is back in the classical regime and has the same state as qubit 201. A flux bias of half a flux quantum is maintained on both qubits during the entire copying operation (steps 401 to 407). The flux bias is within a certain tolerance in order for the copying operation to succeed, and may be equal to the amount of flux coupled from qubit 201 to qubit 203. For example, if the amount of flux coupled is $0.01\Phi_0$, then the accuracy needed for the qubit flux bias may be greater than $\pm 0.01\Phi_0$.

Readout of an Array of Flux Qubits

Figure 5:
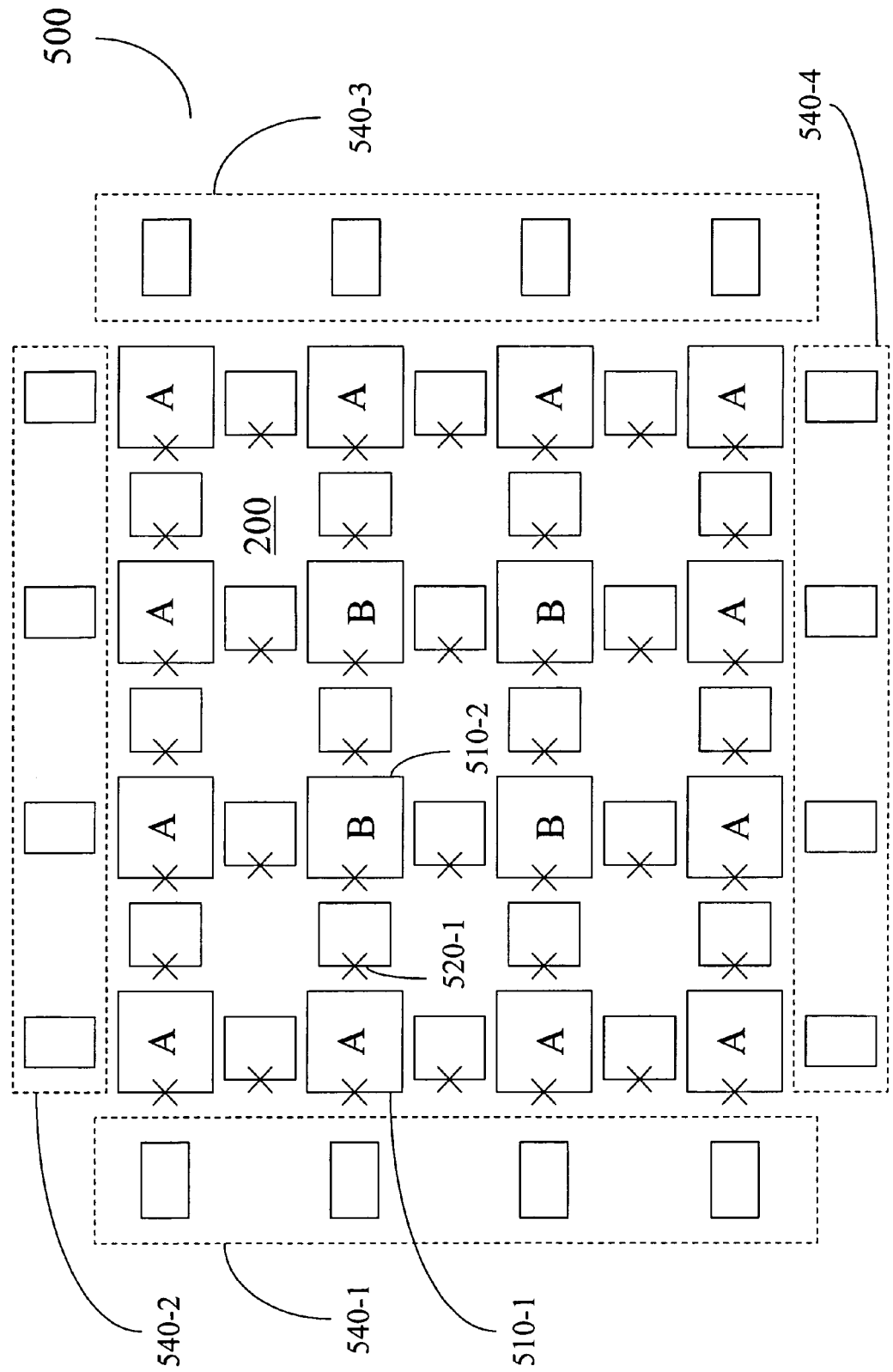
FIG. 5 illustrates an array of coupled flux qubits with readout devices around the periphery in accordance with an embodiment of the present methods and systems.
Figure 6:
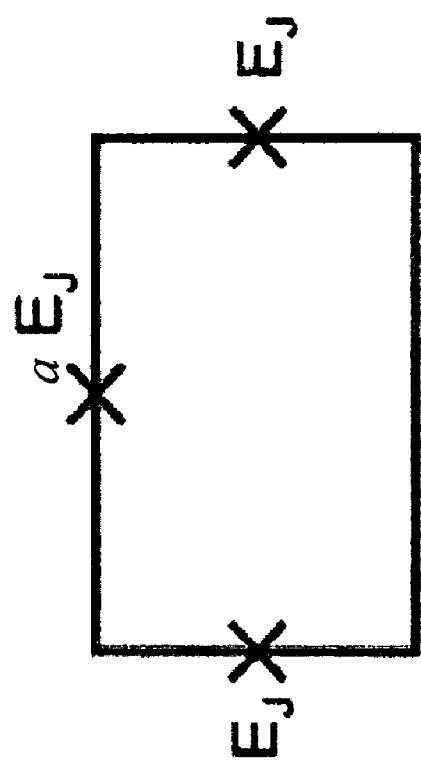
FIG. 6 illustrates a persistent-current qubit in accordance with the prior art.

FIG. 5 shows a two-dimensional array 200 of flux qubits 510. Flux qubits 510 in the interior of the array are labeled B and are coupled to four nearest neighbors by coupling devices 520. Flux qubits 510 on the perimeter of the array are labeled A and are coupled to two or three adjacent qubits, depending on whether the qubit is located on a corner or an edge. Although it is not shown, each qubit 510 may also be coupled to one or more of its four next-nearest neighbor qubits through additional coupling devices aligned diagonally in the array. In conventional qubit arrays, each qubit has an associated readout device that can measure the state of each qubit. However, if the array is large, having a readout device for each qubit quickly becomes cumbersome. Even for the 4×4 array shown in FIG. 5, having a readout device for each qubit becomes a complex design problem, especially for qubits (B) in the interior of the array. Even in the case where coupling devices that couple the qubits together are used as readout devices, the design complexity is still undesirably high.

An aspect of the present methods and systems is the application of ferromagnetic state copying or adiabatic state copying to system 500. By copying the classical state of the interior qubits (B) to the perimeter qubits (A), the interior qubits (B) can be read out without having a specific readout device associated with it. A perimeter qubit (A) is hereinafter defined as a qubit that has an associated readout device. Perimeter qubits (A) are usually located around the periphery of the array of qubits as illustrated in FIG. 5. However, as the termed is used herein, there is no absolute requirement that perimeter qubits (A) be on the perimeter of the array. As such, an interior qubit (B) is hereinafter defined as a qubit in the array that does not have an associated readout device. Thus, a qubit that does not have an associated readout device is an interior qubit (B) even if it is located on the periphery of the array. Readout devices 540 may be placed around the periphery to reduce the layout complexity of the array.

As an example, the state of qubit 510-2 (B) can be copied to qubit 510-1 (A), and then read out by one of the readout devices 540-1. Coupling devices 520 are capable of ferromagnetically coupling qubits together and are capable of turning the coupling off. Coupling devices 520 may also be capable of anti-ferromagnetically coupling two qubits together. Coupling devices 520 may be similar to coupling devices 202 described herein. The coupling strength of coupling devices 520 may be controllably tunable. Flux qubits 510 may be rf-SQUIDs, persistent current qubits, or any other type of qubit that stores information in its flux states. Various readout devices 540 are well known in the art, such as dc-SQUIDs.

A method for reading out the classical state of interior qubit 510-2 (B) is now described. In some cases, all coupling devices 520 in array 500 that are coupled to qubit 510-2 may be turned off. This ensures that the states of the other qubits do not mix with the state of qubit 510-2. Alternatively, coupling devices 520 coupled to qubit 510-2 may be on and the states of the qubits coupled to qubit 510-2 are all known. In this case, even though the state of qubit 510-2 is mixed with the states of other qubits, one can determine what the state of qubit 510-2 is because all the other states are known.

The state of an adjacent qubit that is a perimeter qubit, qubit 510-1, for example, is first read out by one of the readout devices 540-1. This readout may be done more than once, or even multiple times, to increase the fidelity of measurement. Once the information of qubit 510-1 has been obtained, the state of the qubit can be initialized to an arbitrary state. Next, the classical state of qubit 510-2 is copied to qubit 510-1 using coupling device 520-1. The techniques for classical state copying, specifically ferromagnetic state copying (FIG. 3) and adiabatic state copying (FIG. 4), have been described previously for the system in FIG. 2. These techniques can be applied in the same way to qubits in the array of FIG. 5. Once copying has finished, qubit 510-1 will have the same state as qubit 510-2. Qubit 510-1 is then read out by one of the readout devices 540-1, thus effectively reading out the state of qubit 510-2. The state of qubit 510-2 can be copied to qubit 510-1 and read out multiple times to increase measurement fidelity.

Qubit 510-2 is not limited to copying its state to qubit 510-1. The state of qubit 510-2 can be copied to any qubit it is coupled with, provided that the state of the qubit it copies to is either already known (e.g. has been read out already) or is not needed so that information is not lost. The state of qubit 510-2 can be copied and propagated in any direction until it reaches a perimeter qubit, at which point the state is measured. The path that the copied state of qubit 510-2 takes to reach a perimeter qubit may be the shortest path possible. For example, the shortest path for qubit 510-2 to copy is either the qubit to the left (qubit 510-1) or the qubit to the top, since both are perimeter qubits. Qubits to the right and to the bottom of qubit 510-2 are also interior qubits, so the path to a perimeter qubit is longer in this case.

Readout devices 540 may be placed on all sides of the two-dimensional array and there is a readout device for every qubit on the periphery of the array, as illustrated in FIG. 5, or may be placed on only some sides of the array. For example, readout devices 540-1 and 540-3 may be present while 540-2 and 540-4 are not. Alternatively, there may be only one readout device on the perimeter of the array. The number of readout devices available affects the copy path taken from the qubit to be copied to a perimeter qubit that has a readout device as well as the necessity of turning off couplings to the qubit that is to be copied. This assumes that the states of all the qubits in the copy path are already known or are not needed.

FIG. 5 shows a 4×4 array, but the concept easily scales to larger array sizes. The readout procedure for larger arrays is similar to what was described for a 4×4 array. That is, the perimeter qubits are read out first and then their states are reset. Next, the states of interior qubits are copied to perimeter qubits and read out in the manner described above. There is no requirement that all the perimeter qubits be readout before any of the interior qubits are read out. All that is required is that a given perimeter qubit be read out prior to using the perimeter qubit to readout the state of an interior qubit. Thus, it is possible for some interior qubits to be readout before each of the perimeter qubits are readout. Copy and readout operations can be done multiple times to increase measurement fidelity. For instance, the same copy and readout operations can be done twice, three times, four times, five times, more than five times, more than ten times, or more than 100 times.

Coupling devices between qubits may couple the qubits together ferromagnetically during state copying, so that the state of the qubit being copied to is the same as the state of the qubit being copied. Alternatively, coupling devices between qubits may couple the qubits together either ferromagnetically or anti-ferromagnetically during state copying. Anti-ferromagnetic coupling has the effect that the qubit being copied to has the opposite state as the qubit being copied. In some cases where anti-ferromagnetic coupling is used, there may be an even number of anti-ferromagnetic state copying operations between the qubit being copied and the perimeter qubit that is being read out, such that the state of the perimeter qubit is the same as that of the qubit being copied. Alternatively, if there are an odd number of anti-ferromagnetic copies, then the perimeter qubit will have the opposite state as the qubit being copied and the fact that the state being read out is opposite to the state of the qubit being copied may be compensated for in post-processing.

Device Design and Parameters

Device designs and parameters are proposed for the system of FIG. 2 that would suit the present methods and systems for state copying. Qubits 201 and 203 may be rf-SQUIDs, or persistent current qubits. In some cases, qubits 201 and 203 may have a loop area between about 5 $\mu m^2$ and 100000 $\mu m^2$. For example, the loop area of qubits 201 and 203 may be square and have dimensions of 25 $\mu m \times 25$ $\mu m$ (625 $\mu m^2$). For a qubit of this size, the loop inductance is approximately 50 pH. The critical current of qubits 201 and 203 may be between about 0.1 $\mu A$ and 300 $\mu A$, e.g. 15 $\mu A$. In some cases, the critical current, loop inductance, and loop area of qubits 201 and 203 may be close but not the same.

The Josephson energy, and therefore the critical current, of the Josephson junction in qubits 201 and 203 may be tunable. Tunable Josephson energy may be achieved by replacing the single Josephson junction with two parallel junctions that form a loop, otherwise known as a split junction. An example of a split junction flux qubit is shown in FIG. 1C. When the qubits have a split junction, tuning the flux through the loop of the split junction changes the effective Josephson energy of the split junction, which also changes the critical current. Tuning the Josephson junction also has the effect of changing the height of the energy barrier in a qubit. Tunable Josephson energy can also be achieved by applying an in-plane magnetic field through the junction.

In some cases, coupling device 202 may have a loop area between about 5 $\mu m^2$ and 1000 $\mu m^2$. For example, coupling device 202 may be an rf-SQUID, with a square loop area of dimensions of 25 $\mu m \times 25$ $\mu m$ (625 $\mu m^2$), and a loop inductance of approximately 50 pH. In some cases, the critical current of coupling device 202 may be between about 1 $\mu A$ and 10 $\mu A$, e.g. about 5.5 $\mu A$. Coupling device 202 may have a split junction and its Josephson energy may be tunable.

In some cases, the mutual inductance between qubits 201 and 203 and coupling device 202 may be between about 0.5 pH and 20 pH, e.g. 3 pH. The mutual inductance is determined by the geometry of the devices and the distances between them. In some cases, the spacing between each of qubit 201 and 203 and coupling device 202 may be between about 0.1 μm and 10 μm, e.g. 1 μm. A portion of the loop of either qubit 201 or 203 may overlap a portion of the loop of coupling device 202. For example, a portion of wire from a loop of one device may be placed on top (on another layer) of a portion of wire from a loop of another device. There is no galvanic contact between the devices. Overlapping wires increases the mutual inductance between two devices, and therefore increases the coupling strength.

In some cases, the temperature at which system 200 and/or 500 operates at is between about 1 mK and 4 K. For example, the temperature at which system 200 and/or 500 operates may be about 500 mK, which is close to the macroscopic quantum tunneling crossover temperature.

Anti-ferromagnetic State Copying

Embodiments described above for copying a classical state of one qubit to another qubit described involve ferromagnetic coupling between the qubits. However, it will be clear to those of ordinary skill in the art that in the present methods and systems, qubits may be coupled together anti-ferromagnetically. Such coupling is referred to herein as anti-ferromagnetic state copying. Although the term "anti-ferromagnetic state copying" is used it will be understood that the classical state is not literally copied. Rather, the target qubit to which the state of an originating qubit is copied using the anti-ferromagnetic state copying method adopts a state that is opposite to that of the originating qubit. The techniques for anti-ferromagnetic state copying are similar to those described for ferromagnetic state copying except for the fact that the coupling between the qubits is anti-ferromagnetic, not ferromagnetic and the target qubit has a state that is opposite that of the originating qubit. In some cases, some qubit pairs in a given array are ferromagnetically coupled while others are anti-ferromagnetically coupled. All that is required in such topologies is correct bookkeeping of the coupling types between the originating qubit and the target qubit, so that a determination can be made as to whether to reverse the state of the target qubit upon readout or not in order to achieve a representation of the state of the originating qubit.

CONCLUSION AND REFERENCES CITED

As will be apparent to those skilled in the art, the various embodiments described above can be combined to provide further embodiments. Aspects of the present systems, methods and apparatus can be modified, if necessary, to employ systems, methods, apparatus and concepts of the various patents, applications and publications to provide yet further embodiments of the present methods and systems. As used herein, the term "about" means within approximately ±5 to 20% of the stated value. Furthermore, variations in the fabrication details of devices 201, 202, and 203 are within the scope of the present invention. These and other changes can be made to the present systems, methods and apparatus in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

I claim:

1. A method of copying a classical state of a first qubit to a second qubit, the method comprising:
   initializing the second qubit to an initial classical state, wherein the second qubit has a potential energy configuration comprising a first potential well having a first potential minimum and a second potential well having a second potential minimum, and the initial classical state is located in the first potential well;
   adjusting the first potential minimum of the first potential well to a third potential minimum that is higher than the second potential minimum of the second potential well; and
   coupling the first qubit and the second qubit for a duration t.

2. The method of claim 1, wherein the coupling step comprises ferromagnetically coupling the first qubit and the second qubit.

3. The method of claim 1, wherein the coupling step comprises anti-ferromagnetically coupling the first qubit and the second qubit.

4. The method of claim 1, wherein the first qubit has a potential energy configuration that comprises a first tunneling barrier and the potential energy configuration of the second qubit comprises a second tunneling barrier; the method further comprising raising at least one of the first tunneling barrier and the second tunneling barrier prior to the initializing step.

5. The method of claim 4, wherein the third potential minimum is at least slightly lower than the second tunneling barrier.

6. The method of claim 4, wherein the raising step comprises applying a transverse magnetic field to at least one of the first qubit and to the second qubit.

7. The method of claim 4, wherein the raising step comprises tuning a Josephson energy of at least one of the first qubit and the second qubit.

8. The method of claim 1, further comprising adjusting the first potential well from the third potential minimum back to approximately the first potential minimum after the coupling step.

9. The method of claim 1, further comprising reducing a coupling strength between the first qubit and a device coupled to the first qubit to about zero prior to the initializing step.

10. The method of claim 1, further comprising reducing a coupling strength between the second qubit and a device coupled to the second qubit to about zero prior to the initializing step.

11. The method of claim 1, wherein the first potential minimum is about equal to the second potential minimum.

12. The method of claim 1, wherein a potential energy configuration of the first qubit is a bistable potential during the initializing, adjusting, and coupling steps.

13. The method of claim 1, wherein the duration t is between about 1 μs and 100 μs.

14. The method of claim 1, wherein the duration t is greater than about 1 ns.

15. The method of claim 1, wherein the coupling step results in a final classical state of the second qubit matching the classical state of the first qubit.

16. The method of claim 15, wherein the final classical state is reached by a tunneling from the initial classical state to the final classical state.

17. The method of claim 1, wherein the second qubit comprises a superconducting loop and wherein the adjusting step comprises tuning a flux bias through the superconducting loop.

18. The method of claim 1, wherein the second qubit comprises a superconducting loop and wherein the initializing step comprises tuning a flux through the superconducting loop such that a state of the second qubit tunnels to the initial classical state.

19. The method of claim 1, wherein the coupling step comprises:
increasing a coupling strength of a coupling between the first qubit and the second qubit from a minimum value to a predetermined value; and
reducing the coupling strength from the predetermined value to about the minimum value.

20. The method of claim 19, wherein the minimum value of the coupling strength is about zero and the predetermined value of the coupling strength is a maximum coupling strength of the coupling.

21. The method of claim 19, wherein the predetermined value of the coupling strength is greater than one-half of a maximum coupling strength of the coupling.

22. The method of claim 19, further comprising maintaining the coupling strength at the predetermined value for the duration t.

23. The method of claim 1, wherein the coupling step comprises:
turning on a coupling between the first qubit and the second qubit for the duration t; and
turning off the coupling.

24. The method of claim 1, wherein the coupling step is performed using an rf-SQUID.

25. The method of claim 1, wherein the first qubit and the second qubit each comprise an rf-SQUID.

26. The method of claim 1, wherein the first qubit and the second qubit each comprise a split junction.

27. A method of copying a classical state of a first qubit to a second qubit, wherein the first qubit is characterized by a potential energy configuration that comprises a first tunneling barrier, and the second qubit is characterized by a potential energy configuration that comprises a second tunneling barrier; the method comprising:
lowering the second tunneling barrier;
coupling the first qubit and the second qubit for a duration t; and
raising the second tunneling barrier.

28. The method of claim 27, wherein a flux bias of at least one of the first qubit and the second qubit are maintained at about half a flux quantum during at least one of the lowering, coupling and raising steps.

29. The method of claim 28, wherein the flux bias has a tolerance about equal to an amount of flux coupled from the first qubit to the second qubit.

30. The method of claim 27, wherein a flux bias of the first qubit is within a hysteresis region of the first qubit during at least one of the lowering, coupling and raising steps.

31. The method of claim 27, wherein at least one of the lowering and raising steps are performed adiabatically.

32. The method of claim 27, wherein the coupling step comprises ferromagnetically coupling the first qubit and the second qubit.

33. The method of claim 27, wherein the coupling step comprises anti-ferromagnetically coupling the first qubit and the second qubit.

34. The method of claim 27, further comprising raising at least one of the first tunneling barrier and the second tunneling barrier prior to the lowering step.

35. The method of claim 27, further comprising reducing a coupling strength between the first qubit and a device coupled to the first qubit to about zero prior to the lowering step.

36. The method of claim 27, further comprising reducing a coupling strength between the second qubit and a device coupled to the second qubit to about zero prior to the lowering step.

37. The method of claim 27, wherein the potential energy configuration of the first qubit is a bistable potential and the potential energy configuration of the second qubit is a bistable potential.

38. The method of claim 37, wherein the bistable potential of at least one of the first qubit and the second qubit comprises two nearly degenerate energy levels.

39. The method of claim 27, wherein the raising step comprises applying a transverse magnetic field to at least one of the first qubit and the second qubit.

40. The method of claim 27, wherein the second qubit has a classical state and wherein the raising step comprises preventing the classical state of the second qubit from tunneling.

41. The method of claim 27, wherein a time duration $t_2$ of the lowering step is greater than about 1 µs.

42. The method of claim 27, wherein a time duration $t_2$ of the lowering step is between about 100 ns and 1 ms.

43. The method of claim 27, wherein the second qubit does not tunnel during at least one of the lowering step and the raising step.

44. The method of claim 27, wherein a time duration $t_3$ of the raising step is greater than about 1 µs.

45. The method of claim 27, wherein a time duration $t_3$ of the raising step is between about 100 ns and 1 ms.

46. The method of claim 27, wherein the second qubit comprises a split junction and wherein the lowering step and the raising step each comprise tuning a flux in the split junction.

47. The method of claim 27, wherein the coupling step comprises:
increasing a coupling strength of a coupling between the first qubit and the second qubit from a minimum coupling strength to a predetermined coupling strength;
maintaining the coupling strength at the predetermined coupling strength for the duration t; and
decreasing the coupling strength from the predetermined coupling strength to the minimum coupling strength.

48. The method of claim 47, wherein the minimum coupling strength is about zero and the predetermined coupling strength is a maximum coupling strength of the coupling.

49. The method of claim 47, wherein the predetermined coupling strength is greater than one-half of a maximum coupling strength of the coupling.

50. The method of claim 47, further comprising maintaining the coupling strength at the predetermined coupling strength for the duration t.

51. The method of claim 27, wherein the coupling step comprises:
turning on a coupling between the first qubit and the second qubit for the duration t; and
turning off the coupling.

52. The method of claim 27, wherein the coupling step is performed using an rf-SQUID.

53. The method of claim 27, wherein the duration t is between about 1 µs and 100 µs.

54. The method of claim 27, wherein the duration t is greater than about 1 ns.

55. The method of claim 27, wherein the first qubit and the second qubit each comprise an rf-SQUID.

56. The method of claim 27, wherein the coupling step comprises tunneling through the second tunneling barrier such that a final classical state of the second qubit matches the classical state of the first qubit.

57. A method for reading out a classical state of a qubit in an array of qubits, the array comprising a plurality of perimeter qubits and a plurality of interior qubits, the method comprising:

initializing a classical state of a perimeter qubit, wherein the perimeter qubit has an associated readout device;

copying a classical state of an interior qubit to the perimeter qubit;

reading out the classical state of the interior qubit by reading out the classical state of the perimeter qubit, wherein the perimeter qubit is coupled to the interior qubit via a coupling device having a coupling strength that is adjustable between a minimum coupling strength and a predetermined coupling strength.

58. The method of claim 57, wherein the minimum coupling strength is about zero and the predetermined coupling strength is a maximum coupling strength of the coupling.

59. The method of claim 57, wherein the predetermined coupling strength is greater than one-half of a maximum coupling strength of the coupling.

60. The method of claim 57, further comprising repeating the initializing, copying and interior qubit readout steps for each of a plurality of interior qubits.

61. The method of claim 57, wherein the initializing step comprises initializing the perimeter qubit to an arbitrary classical state.

62. The method of claim 57, wherein the perimeter qubit comprises a superconducting loop and wherein the initializing step comprises tuning a flux through the superconducting loop such that a state of the perimeter qubit tunnels to an arbitrary classical state.

63. The method of claim 57, wherein the coupling device ferromagnetically couples the interior qubit to the perimeter qubit and wherein the copying step comprises copying the classical state of the interior qubit to the perimeter qubit via the ferromagnetic coupling.

64. The method of claim 57, wherein the coupling device anti-ferromagnetically couples the interior qubit to the perimeter qubit and wherein the copying step comprises copying the classical state of the interior qubit to the perimeter qubit via the anti-ferromagnetic coupling.

65. The method of claim 57, wherein the perimeter qubit is characterized by a potential energy configuration comprising a tunneling barrier, and wherein the copying step comprises:

lowering the tunneling barrier;

coupling the interior qubit and the perimeter qubit for a duration t; and raising the tunneling barrier.

66. The method of claim 65, wherein at least one of the lowering and the raising steps is performed adiabatically.

67. The method of claim 65, further comprising maintaining a flux bias of at least one of the interior qubit and the perimeter qubit at about half a flux quantum during the copying step.

68. The method of claim 57, wherein the perimeter qubit is not adjacent to the interior qubit and the copying step comprises copying the classical state of the interior qubit to at least one intermediate qubit located between the interior qubit and the perimeter qubit.

69. The method of claim 57, wherein the initializing, copying and interior qubit readout steps are performed more than once.

70. The method of claim 57, wherein the array is a two-dimensional array of flux qubits.

71. The method of claim 57, wherein the coupling device is configured to controllably ferromagnetically or anti-ferromagnetically couple the interior qubit to the perimeter qubit.

72. The method of claim 57, wherein at least one of the interior qubit, the perimeter qubit and the coupling device comprises an rf-SQUID.

73. The method of claim 57, wherein at least one of the interior qubit and the perimeter qubit comprises a split junction.

74. The method of claim 57, wherein:

the initializing step comprises initializing the perimeter qubit to an initial classical state;

the perimeter qubit is characterized by a potential energy configuration comprising a first potential well having a first potential minimum and a second potential well having a second potential minimum;

the initial classical state is located in the first potential well; and the copying step comprises:

adjusting the first potential minimum to a third potential minimum that is higher than the second potential minimum; and coupling the interior qubit and the perimeter qubit for a duration t.

75. A method of copying a classical state of a first qubit means to a second qubit means, the method comprising:

means for coupling the first qubit means to the second qubit means;

means for adjusting at least one of a tunneling barrier of the first qubit means and a tunneling barrier of the second qubit means; and means for adjusting a symmetry of a potential energy configuration of at least one of the first qubit means and the second qubit means.

76. The method of claim 75, wherein the means for adjusting the tunneling barrier comprises means for adjusting a Josephson energy of at least one of the first qubit means and the second qubit means.

77. The method of claim 75, wherein the means for adjusting the tunneling barrier comprises means for tuning a magnetic field bias transverse to at least one of the first qubit means and the second qubit means.

78. The method of claim 75, wherein the means for adjusting the symmetry of the potential energy configuration comprises means for tuning a flux bias of the first qubit means and the second qubit means.

79. The method of claim 75, wherein the means for coupling comprises means for tuning a coupling strength of the coupling means.

80. A system for copying a classical state of a first qubit to a second qubit, wherein the first qubit is characterized by a potential energy configuration that comprises a first tunneling barrier, and the second qubit is characterized by a potential energy configuration that comprises a second tunneling barrier; the system comprising:

a first barrier adjustment module, comprising instructions for lowering the second tunneling barrier;

a coupling module, comprising instructions for coupling the first qubit to the second qubit; and a second barrier adjustment module, comprising instructions for raising the second tunneling barrier.

81. The system of claim 57, wherein the first barrier adjustment module and the second barrier adjustment module comprise a single module.

82. The system of claim 57, further comprising a flux module, comprising instructions for maintaining a flux bias of at least one of the first qubit and the second qubit at about half a flux quantum during at least a portion of the copying process.

83. A computer-readable medium storing executable instructions for:
- initializing a first qubit to an initial classical state, wherein the first qubit has a potential energy configuration comprising a first potential well having a first potential minimum and a second potential well having a second potential minimum, and the initial classical state is located in the first potential well;
- adjusting the first potential minimum of the first potential well to a third potential minimum that is higher than the second potential minimum of the second potential well; and
- coupling the first qubit and a second qubit for a duration t.

* * * * *

UNITED STATES PATENT AND TRADEMARK OFFICE
CERTIFICATE OF CORRECTION

| | |
|---|---|
| PATENT NO. | : 7,639,035 B2 |
| APPLICATION NO. | : 11/411051 |
| DATED | : December 29, 2009 |
| INVENTOR(S) | : Andrew J. Berkley |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 918 days.

Signed and Sealed this

Ninth Day of November, 2010

David J. Kappos
*Director of the United States Patent and Trademark Office*